United States Patent
Smolic et al.

(10) Patent No.: US 9,979,895 B2
(45) Date of Patent: May 22, 2018

(54) HIGH DYNAMIC RANGE TONE MAPPING

(71) Applicant: Disney Enterprises, Inc., Burbank, CA (US)

(72) Inventors: Aljosa Aleksej Andrej Smolic, Aargau (CH); Tunc Ozan Aydin, Zurich (CH); Simone Maurizio Croci, Mendrisio (CH); Nikolce Stefanoski, Zurich (CH)

(73) Assignees: Disney Enterprises, Inc., Burbank, CA (US); ETH Zurich (Eidgenoessische Technische Hochschule Zurich), Zurich (CH)

( * ) Notice: Subject to any disclaimer, the term of this patent is extended or adjusted under 35 U.S.C. 154(b) by 0 days. days.

(21) Appl. No.: 14/951,779

(22) Filed: Nov. 25, 2015

(65) Prior Publication Data
US 2017/0070719 A1    Mar. 9, 2017

Related U.S. Application Data

(60) Provisional application No. 62/214,636, filed on Sep. 4, 2015.

(51) Int. Cl.
*H04N 5/235*    (2006.01)
*H04N 9/77*    (2006.01)
(Continued)

(52) U.S. Cl.
CPC .......... *H04N 5/2355* (2013.01); *G06T 5/009* (2013.01); *G06T 5/50* (2013.01); *H04N 5/355* (2013.01);
(Continued)

(58) Field of Classification Search
CPC ........ H04N 5/2355; H04N 9/77; H04N 5/355; G06T 5/009; G06T 5/50; G06T 2207/20208; G06T 2207/10016
See application file for complete search history.

(56) References Cited

U.S. PATENT DOCUMENTS

2005/0180629 A1    8/2005    Masuno et al.
2011/0235720 A1*   9/2011    Banterle .................. G06T 5/009
                                                              375/240.25
(Continued)

FOREIGN PATENT DOCUMENTS

EP            2144444 A1    1/2010
WO    2015077329 A1    5/2015

OTHER PUBLICATIONS

Aydin, et al., Temporally Coherent Local Tone Mapping of HDR Video, Proceedings of ACM SIGGRAPH Asia 2014, vol. 33 Issue 6, Nov. 19, 2014, ACM, New York, United States.
(Continued)

*Primary Examiner* — Shahbaz Nazrul
(74) *Attorney, Agent, or Firm* — Patterson + Sheridan, LLP (57) ABSTRACT

Embodiments herein disclose a tone mapping system that generates a base layer by filtering a frame in an HDR video. The tone mapping system then generates a tone curve using a tone mapping parameter derived from the base layer—e.g., a mean or maximum luminance value. Once the tone curve parameter is identified, the system performs temporal filtering to smooth out inconsistencies between the current value of the tone curve parameter and the values of tone curve parameter of at least one previous frame in the HDR video. The tone mapping system applies the temporally filtered tone curve to the base layer to generate a temporally coherent layer. The temporally coherent base layer can be combined with a detail layer derived from the HDR video to generate a frame of a tone mapped video.

20 Claims, 5 Drawing Sheets

(51) Int. Cl.
  *H04N 5/355* (2011.01)
  *G06T 5/50* (2006.01)
  *G06T 5/00* (2006.01)
(52) U.S. Cl.
  CPC ..... *H04N 9/77* (2013.01); *G06T 2207/10016* (2013.01); *G06T 2207/20182* (2013.01); *G06T 2207/20208* (2013.01)

(56) References Cited

U.S. PATENT DOCUMENTS

| | | | | |
|---|---|---|---|---|
| 2014/0369410 | A1* | 12/2014 | Olivier | H04N 19/597 375/240.12 |
| 2015/0178904 | A1* | 6/2015 | Boitard | G06T 5/007 382/274 |
| 2016/0012573 | A1* | 1/2016 | Boitard | H04N 19/147 382/274 |
| 2016/0027160 | A1* | 1/2016 | Aydin | G06T 5/40 382/162 |
| 2016/0027161 | A1* | 1/2016 | Aydin | G06T 5/009 382/162 |
| 2016/0127736 | A1* | 5/2016 | Touze | H04N 19/33 348/674 |
| 2016/0142593 | A1* | 5/2016 | Boitard | G06T 5/007 348/701 |
| 2016/0156908 | A1* | 6/2016 | Olivier | H04N 19/30 375/240.02 |
| 2016/0328830 | A1* | 11/2016 | Pouli | H04N 5/57 |
| 2016/0330456 | A1* | 11/2016 | Lasserre | H04N 19/30 |
| 2016/0345017 | A1* | 11/2016 | Lasserre | G09G 3/3406 |
| 2016/0366423 | A1* | 12/2016 | Laserre | H04N 19/50 |

OTHER PUBLICATIONS

Eilertsen, Gabriel et al., Evaluation of Tone Mapping Operators for HDR-Video, Pacific Graphics 2013, vol. 32, 10 pages, Oct. 2013, John Wiley & Sons Ltd., Hoboken, United States.

Kiser, Chris et al., Real Time Automated Tone Mapping System for HDR Video, Proceedings of the IEEE International Conference on Image Processing, Sep. 2012, 4 pages, IEEE, Piscataway, United States.

Zimmer, Henning et al., Optic Flow in Harmony, International Journal of Computer Vision, vol. 93, Issue 3, Jul. 2011, pp. 368-388, Kluwer Academic Publishers, Hingham, United States.

Extended European Search Report for Application No./Patent No. 16187288.2-1906, dated Jan. 27, 2017.

* cited by examiner

HIGH DYNAMIC RANGE TONE MAPPING

CROSS-REFERENCE TO RELATED APPLICATIONS

This application claims benefit of U.S. provisional patent application Ser. No. 62/214,636, filed Sep. 4, 2015. The aforementioned related patent application is herein incorporated by reference in its entirety.

BACKGROUND

Field of the Invention

Embodiments presented in this disclosure generally relate to performing tone mapping for high dynamic range (HDR) video.

Description of the Related Art

Tone mapping is typically performed before HDR video can be outputted on a display device (e.g., a monitor, television, display on a mobile device, etc.) that does not support a high-dynamic color range. The range of colors in the HDR video may exceed the range of colors that can be outputted by the display device. As such, tone mapping converts the frames in the HDR video into corresponding frames with colors that are within the color range of the display device. Moreover, tone mapping can adjust the brightness levels as captured by cameras (which generate the HDR video) to match the capabilities of the display devices that output the video.

SUMMARY

Embodiments herein describe a method that includes generating a base layer using a frame of a HDR video and deriving a tone curve parameter from the base layer. The method includes temporally filtering the tone curve parameter and generating a temporally coherent base layer using a tone curve derived from the temporally filtered tone curve parameter.

Embodiments herein describe a computer-readable storage medium comprising computer-readable program code executable in a processor to generate a base layer using a frame of a HDR video and derive a tone curve parameter from the base layer. The program code is also executable to temporally filter the tone curve parameter and generate a temporally coherent base layer using a tone curve derived from the temporally filtered tone curve parameter.

Embodiments herein describe tone mapping system that includes a computer processor and one or more memories containing a program which, when executed on the computer processor, performs an operation. The operation includes generating a base layer using a frame of a HDR video and deriving a tone curve parameter from the base layer. The operation also includes temporally filtering the tone curve parameter and generating a temporally coherent base layer using a tone curve derived from the temporally filtered tone curve parameter.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Temporal coherency has been a chronic problem of HDR video tone mapping techniques. Generally, temporal coherency describes the degree to which the tone mapping performed on individual frames of the HDR video is consistent from one frame to the next. The lack of temporal coherency in tone mapped content often manifests as abrupt brightness changes (e.g., flashes) between consecutive frames which can be perceived by the human eye. These flashes have restricted the use of video tone mapping. U.S. patent application Ser. No. 14/121,091 entitled "TEMPORALLY COHERENT LOCAL TONE MAPPING OF HIGH DYNAMIC RANGE VIDEO," which is incorporated herein by reference, describes techniques for performing local video tone mapping in a temporally coherent manner. The embodiments herein describe techniques for performing tone mapping that may require relatively less computing resources.

In one embodiment, a tone mapping system generates a base layer by filtering a frame in an HDR video. A tone mapping parameter is then derived from the base layer—e.g., the mean or maximum luminance value of the base layer. Once the tone curve parameter is identified, the system performs temporal filtering to smooth out inconsistencies between the value of the tone curve parameter for a current frame and the value(s) of the tone curve parameter of at least one previous frame in the HDR video. By temporally filtering the values of the tone curve parameter, the tone mapping system can reduce or remove the abrupt brightness changes or flashes between frames in the resulting tone mapped video. Moreover, the embodiments herein do not need to perform temporally filtering on the entire base layer but rather only on the tone curve parameter which may be a much less compute intensive process. The tone mapping system applies the temporally filtered tone curve to the base layer to generate a temporally coherent layer.

In one embodiment, the tone mapping system generates a detail layer by dividing the base layer by the corresponding frame in the HDR video stream. The tone mapping system combines the temporally coherent layer and the detail layer to result in the frames of the tone mapped video. These frames can be displayed on a user device that has limited color range but still preserve much of the color contrast and detail in the original HDR video. One advantage of applying the tone curve to the base layer, but not the detail layer, is that doing so preserves much of the detail in the HDR video that would otherwise be lost if the tone curve was applied to both the base and detail layers.

Figure 1:
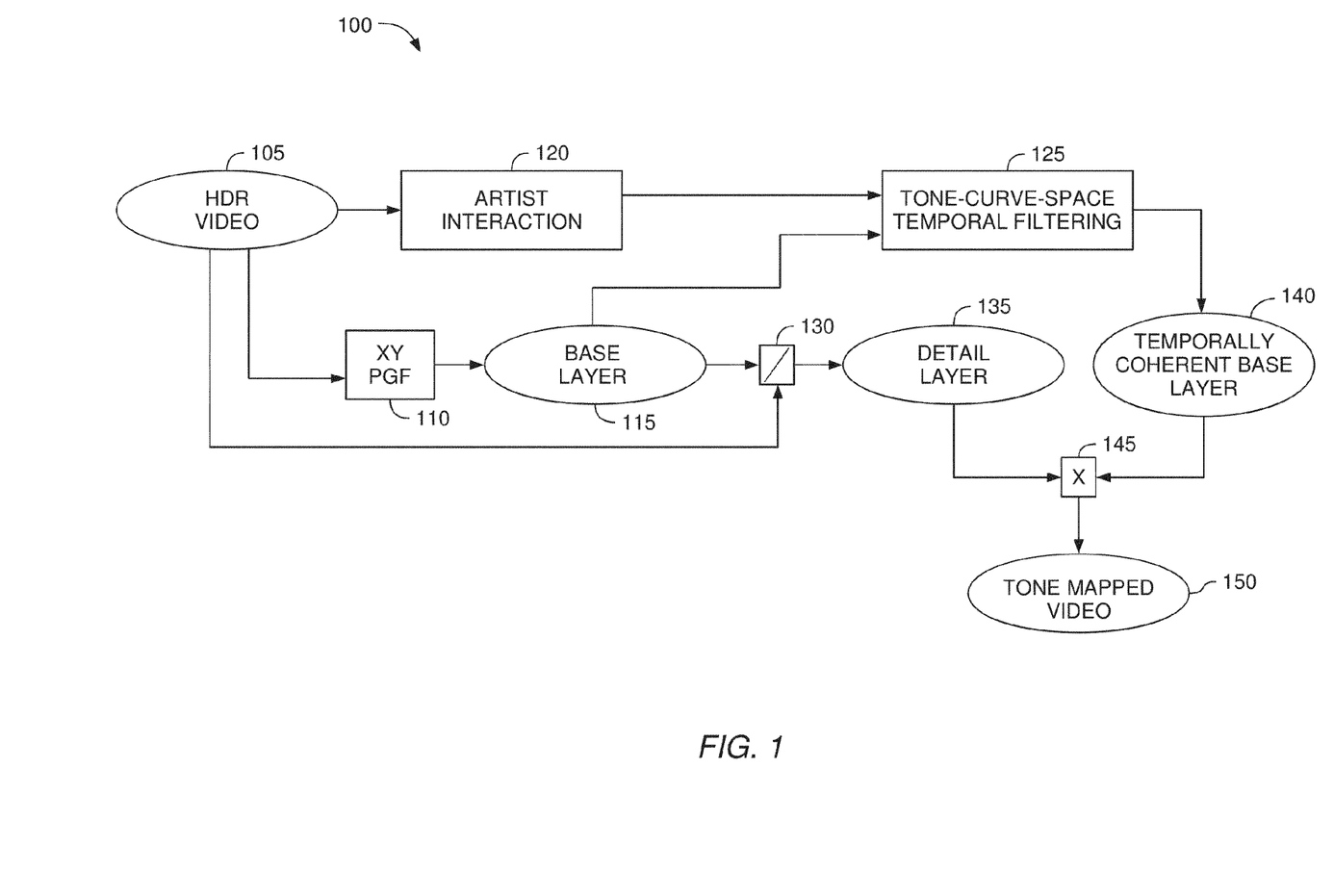
FIG. 1 is a flowchart for converting HDR video into tone mapped video, according to one embodiment described herein.

FIG. 1 is a system flow 100 for converting HDR video into tone mapped video, according to one embodiment described herein. In flow 100, the boxes represent functions of a tone mapping system while the circles indicate data that is generated or stored in the tone mapping system. As shown, flow 100 begins when HDR video 105 is received at the tone mapping system. The HDR video 105 may be stored in the tone mapping system (e.g., as a complete media presentation) or may be sent to the system in smaller chunks for processing. Generally, flow 100 illustrates a technique for converting the individual frames of the HDR video 105 into frames of a tone mapped video 150. Put differently, the tone mapped video 150 may have similar color contrast and details (e.g., edges and textures) as the frames of the HDR video 105 but with a smaller color range than the HDR video 105.

The tone mapping system uses a spatial filter 110 to process a frame of the HDR video 105. In this example, the spatial filter 110 is a permeability guided filter (PGF) which receives a frame of the HDR video 105 and outputs a base layer 115. Generally, the base layer 115 represents the luminance values of the pixels in the HDR video frame. In one embodiment, to generate the base layer 115, the PGF 110 processes the frames in the HDR video 105 spatially (e.g., in the X and Y dimensions on the pixel plane) but not temporally. In one embodiment, the PGF 110 spatially filters each pixel in an HDR frame by determining a spatially local neighborhood defined by pixel locations on a uniform grid. The spatially local neighborhood for a given pixel is defined as a set of two or more pixels that are spatially near the given pixel In one embodiment, the PGF 110 generates the base layer 115 without considering previous filter frames—i.e., without performing temporal filtering. Filtering the frames in the X and Y spatial dimensions may require less computing time and resources than filtering the frames temporally—i.e., in the time dimension. Thus, the xy PGF 110 may process a received frame quicker than a filter that processes the frames both temporally and spatially.

In addition, the tone mapping system permits artist interaction 120 in order to process the HDR video frames. In one example, a technician may perform color grading to change highlight or other characteristics in the HDR video 105. These artistic changes are referred to herein as artistic settings. With previous tone mapping techniques, a technician would need to wait for hours if not days for the tone mapping system to modify the HDR video 105 according to the artistic settings and output the resulting tone mapped video 150. If the technician does not like the resulting tone mapped video 150, the technician changes the artistic settings and again waits for the tone mapping system to convert the HDR video 105 into the tone mapped video 150.

The embodiments herein may be used to provide real-time feedback to the technician. That is, flow 100 can be performed in a manner such that the color changes made by the technician are used to generate the tone mapped video 150 instantaneously or almost instantaneously—e.g., within a few seconds. Thus, the technician can receive almost immediate feedback regarding her changes without having to wait for hours for the tone mapping system to generate the tone mapped video 150.

Using the artistic settings and the base layer, the tone mapping system performs tone-curve-space temporal filtering 125. Generally, tone-curve-space temporal filtering 125 generates temporally filtered tone curves that can be used to process the base layers to generate temporally coherent base layers 140. The details of tone-curve-space temporal filtering 125 are described in FIG. 2.

Figure 2:
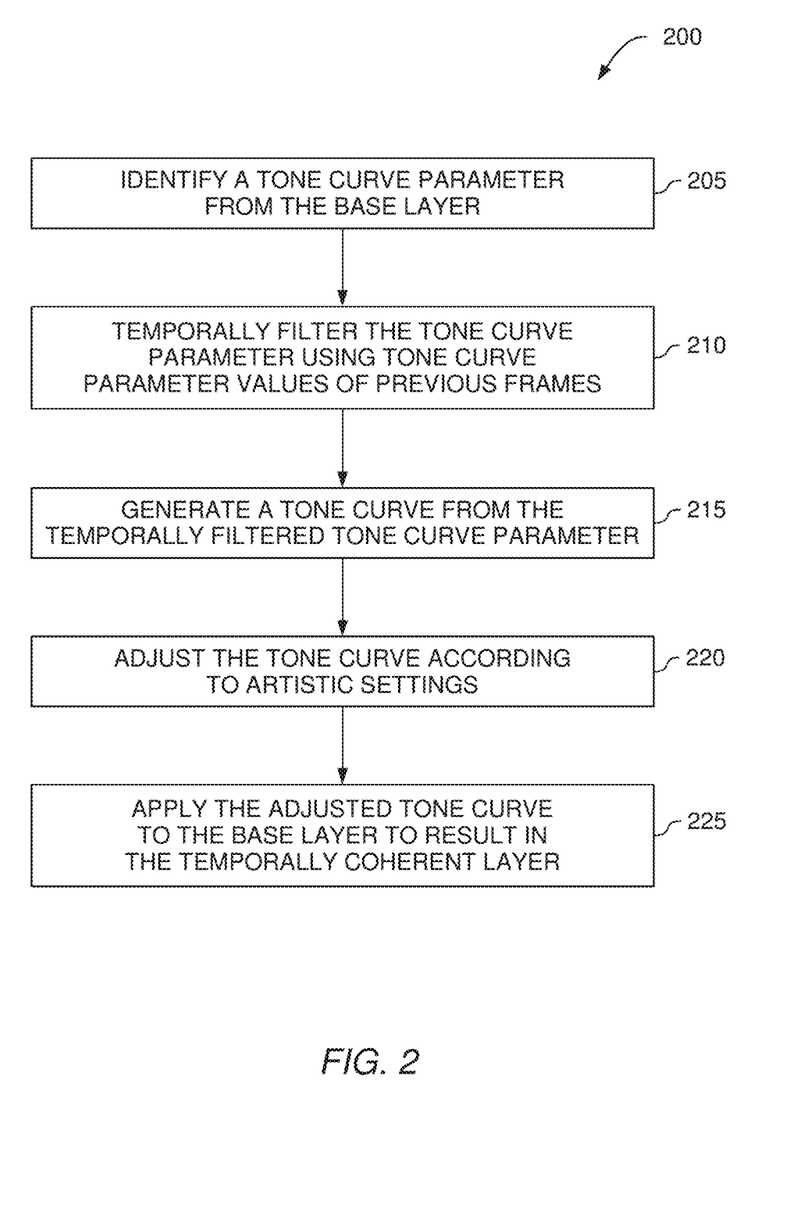
FIG. 2 is a flowchart for temporally filtering tone curves, according to one embodiment described herein.

FIG. 2 is a flowchart of a method 200 for temporally filtering tone curves, according to one embodiment described herein. At block 205, the tone mapping system identifies a tone curve parameter from the base layer. Generally, the tone curve parameter is a statistical value derived from the base layer. In one embodiment, the tone curve parameter is an illumination value derived from the base layer. For example, the tone mapping system may evaluate each of the pixels in the base layer to identify the mean luminance value, the maximum luminance value, or the minimum luminance value of the base layer. The mean, maximum, and minimum luminance values are only three examples of suitable tone curve parameters that can be used to generate a tone curve. One of ordinary skill will recognize that other image statistical parameters may be derived from the base layer which can instead be used as the tone curve parameter. Moreover, while method 200 discusses deriving one tone curve parameter, the tone mapping system may derive multiple tone curve parameters which may be combined or weighted.

At block 210, the tone mapping system temporally filters the tone cure parameter using tone curve parameter values derived from previous frames. That is, the tone mapping system modifies the tone curve parameter for the current frame using values of previous tone curve parameters. For example, the tone mapping system may adjust the mean luminance value derived for the current base layer using mean luminance values derived from previous base layers in order to reduce differences between these values.

The tone curve parameter derived from the base layer can change drastically between different frames in the HDR video. For example, even if two frames in the HDR video do not vary much in brightness when viewed by the user, the tone curve parameter values for these frames may still vary greatly for many different reasons. If the tone curve parameters are not temporally filtered, the user may notice flashes in the resulting tone mapped video as mentioned above. Thus, at block 210, the tone mapping system uses past values of the tone curve parameter in order to limit or reduce the amount of change in the tone curve parameter when processing a new frame.

Equation 1 represents an example calculation that may be performed by the tone mapping system to temporally filter the tone curve parameter. In one embodiment, Equation 1 is a linear or convex combination of tone curve parameters.

$$p_t = a p_{t-1} + (1-a)\hat{p}_t \qquad (1)$$

In Equation 1, $\hat{p}_t$ is the current value of the tone curve parameter while $p_{t-1}$ is the value of the tone curve parameter of the previous frame. The variable $p_t$ is a temporally filtered tone curve parameter which is then used to generate a tone curve as described below. The a is a user-defined parameter that weights the previous value of the tone curve parameter relative to the current value.

In Equation 1, the tone mapping system applies a first weight (i.e., a) to previous value of the tone curve parameter ($p_{t-1}$) and a second weight (i.e., 1−a) to the current value of the tone curve parameter ($\hat{p}_t$). As the value of alpha increases, the less deviation or change is permitted between the current tone curve parameter value and the previous value. Put differently, the previous tone curve parameter is given more weight so that the difference between the previous and current values is reduced. Conversely, as the value of alpha decreases, more deviation or change is permitted between the current and previous values of the tone curve parameter. Lower values of alpha would permit sudden changes in illumination between the current and the previous frames that would otherwise be removed or reduced if the value of alpha was increased.

A system operator may set the value of alpha to suit the particular media presented in the HDR video. For example, if the HDR video has drastic luminance changes between frames (e.g., a video of fireworks or a strobe light), then the technician may select a value of alpha closer to zero in order to output tone mapped video that contains the drastic luminance changes between frames. However, if the luminance changes in the HDR video are slight—e.g., the video is captured outside in constant sunlight—the technician may choose a higher value of alpha to ensure any changes in the tone curve parameter between frames is reduced so that the resulting tone mapped video does not contain unintended flashes. Thus, by characterizing the luminance changes in the HDR video, the system operator can adjust the alpha value to balance between ensuring that the intended changes in brightness between the frames remain in the tone mapped video and reducing undesired flashing or flickering caused by changes in the tone curve parameter.

Although Equation 1 illustrates generating a temporally filtered tone curve parameter ($p_t$) by weighting the tone curve parameter values for the current and previous frame, in other embodiments, the tone mapping system may generate the adjusted tone curve parameter using tone curve parameter values from multiple frames previously processed by the tone mapping system. For example, instead of using only the tone curve parameter from the previous frame (i.e., $p_{t-1}$), the tone mapping system may use an average of the previous five tone curve parameter values. By maintaining a running average of previous tone curve parameters, the tone mapping system can temporally filter the current tone curve parameter to prevent unintended flashes in the tone mapped video.

Moreover, by temporally filtering the tone curve parameter, the tone mapping system avoids temporally filtering the base layer itself. That is, rather than temporally filtering each pixel of the base layer (which can include millions of pixels), in one embodiment, the tone mapping system only temporally filters the tone curve parameter using previous values of the parameter. Doing so may enable the tone mapping system to be performed in real-time.

At block 215, the tone mapping system generates a tone curve from the temporally filtered tone curve parameter (i.e., $p_t$). Generally, the tone curve can be a mapping between input luminance and output luminance. The tone curve enables the tone mapping system to compress the color range of the pixels in the HDR video into a smaller color range used by non-HDR user devices—e.g., televisions, displays in a smartphone or tablet, computer monitors, etc. Although the embodiments herein describe generating and applying a single tone curve, the tone mapping system may generate multiple tone curves (or use predefined tone curves) for processing the base layer to result in the temporally coherent base layers.

At block 220, the tone mapping system adjusts the tone curve according to the artistic settings. In FIG. 1, the artist interaction 120 generates artistic settings which are then provided to the tone-curve-space temporal filter 125. For example, a technician may wish to change the highlights a portion of the tone curve to emphasis a particular color or range of colors. These artistic settings change the shape of the tone curve.

However, using artistic settings to change the tone curve is not a requirement. Although method 200 enables the artistic settings to be used to adjust the tone mapped video in real-time, method 200 may be performed without any artist interaction. In this scenario, the tone curve is generated using only the tone curve parameter (or parameters) derived from the base layer.

At block 225, the tone mapping system applies the adjusted tone curve to the base layer thereby resulting in the temporally coherent base layer. Put differently, the tone mapping system uses the relationship between input and output luminance defined in the tone curve to adjust the luminance values of the pixels in the base layer. Because the tone curve is generated using the temporally filter tone curve parameter, applying the tone curve to the base layer results in a temporally coherent base layer where the unintended changes in the luminance values relative to the base layers of previous frames are mitigated.

Moreover, one advantage of applying the tone curve to only the base layer (rather than both the base layer and detail layer) is that doing so preserves artistic freedom by enabling local tone mapping operations. Treating the base and detail layers separately allows precise control over the visibility of the features in the detail layer. Moreover, the tone curve parameters are more stable (i.e., smaller changes in the tone curve parameter between frames) when the parameters are derived from the base layer rather than directly from the HDR video. This is because the filter used to generate the base layer reduces local variation in the luminance values in the HDR video and removes outliers. Thus, deriving the tone curve parameters from the base layer also helps to stabilize the temporal differences in the tone curve parameters and mitigate the flashes described above.

Returning to flow 100 in FIG. 1, performing the tone-curve-space temporal filtering 125 results in the temporally coherent base layers 140. To generate the tone mapped video 150, the tone mapping system combines the temporally coherent base layer 140 with a detail layer 135. The detail layer 135 is derived by dividing each pixel in the HDR video 105 by the corresponding pixel in the base layer 115. Put differently, the same HDR video frame used to generate the base layer 115 is divided by the base layer 115 to yield the detail layer 135. The dividing function 130 removes the luminance from the HDR video frame but leaves the texture and edge information which is stored in the detail layer 135. Although not shown in flow 100, a technician may provide artistic settings for changing the detail layer 135. For example, the technician may wish to sharpen an edge or adjust a texture in the detail layer 135. These changes can be made directly to the detail layer 135.

The tone mapping system using a pixel-by-pixel multiplication function 145 to combine the detail layer 135 with the temporally coherent base layer 140 to generate a frame of the tone mapped video 150. Generally, the tone mapped video 150 includes similar color contrast and detail (e.g., similar texture) as the HDR video 105 but with a reduced color range. In one embodiment, the multiplication function 145 is weighted to perform amplification on the colors. However, in another embodiment, the multiplication function 145 is not weight and the level of detail is controlled by the tone curve—i.e., if the base layer is heavily compressed, then details are more apparent, and vice versa.

Flow 100 repeats for each frame in the HDR video 105. As such, the tone mapping system generates a base layer 115 for each frame, identifies the value of the tone curve parameter from the base layer 115, and temporally filters the tone curve parameter. Using a tone curve generated from the parameter, temporally filtering 125 the tone curve parameter and generating a tone curve results in a temporally coherent base layer 140 which is combined with the detail layer 135 to generate the tone mapped video 150.

Figure 3:
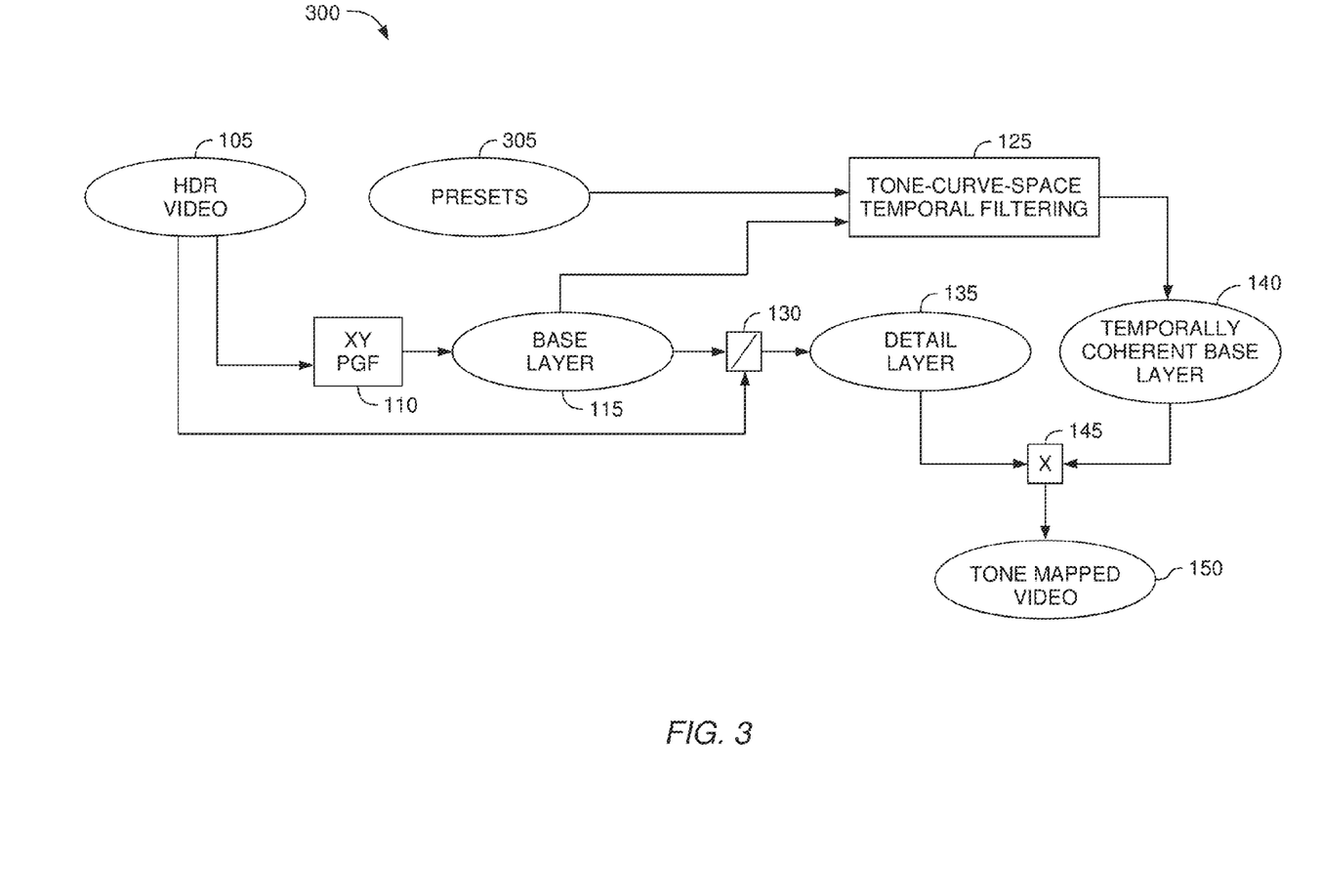
FIG. 3 is a flowchart for converting HDR video into tone mapped video, according to one embodiment described herein.

FIG. 3 is a system flow 300 for converting HDR video into tone mapped video, according to one embodiment described herein. Flow 300 is the same as flow 100 in FIG. 1 except that the artist interaction 120 has been replaced by presets 305. In one embodiment, flow 300 may preferred when the HDR video 105 is for a live broadcast where the tone mapping system uses flow 300 to convert the HDR video 105 into the tone mapped video 150 which is then broadcast out to user devices. For example, the tone mapped video 150 may be sent to a distribution network (e.g., a cable or satellite provider) to be transmitted to user devices.

To minimize delay, instead of a technician viewing the HDR video and providing artistic settings, the tone mapping system uses the presets 305 to alter the tone curves generated by the tone-curve-space temporal filtering 125. Like the artistic settings, the presets 305 may adjust the highlights or color distribution of the HDR video 105. Since the presets 305 may be defined before the HDR video 105 is generated, the tone mapping system can use the presets 305 to adjust the tone curves as soon as they are calculated. Thus, the tone mapping system can perform flow 300 in real time to generate tone mapped video 150 for sporting events, live concerts, live news broadcasts, and the like with minimal delay.

Figure 4:
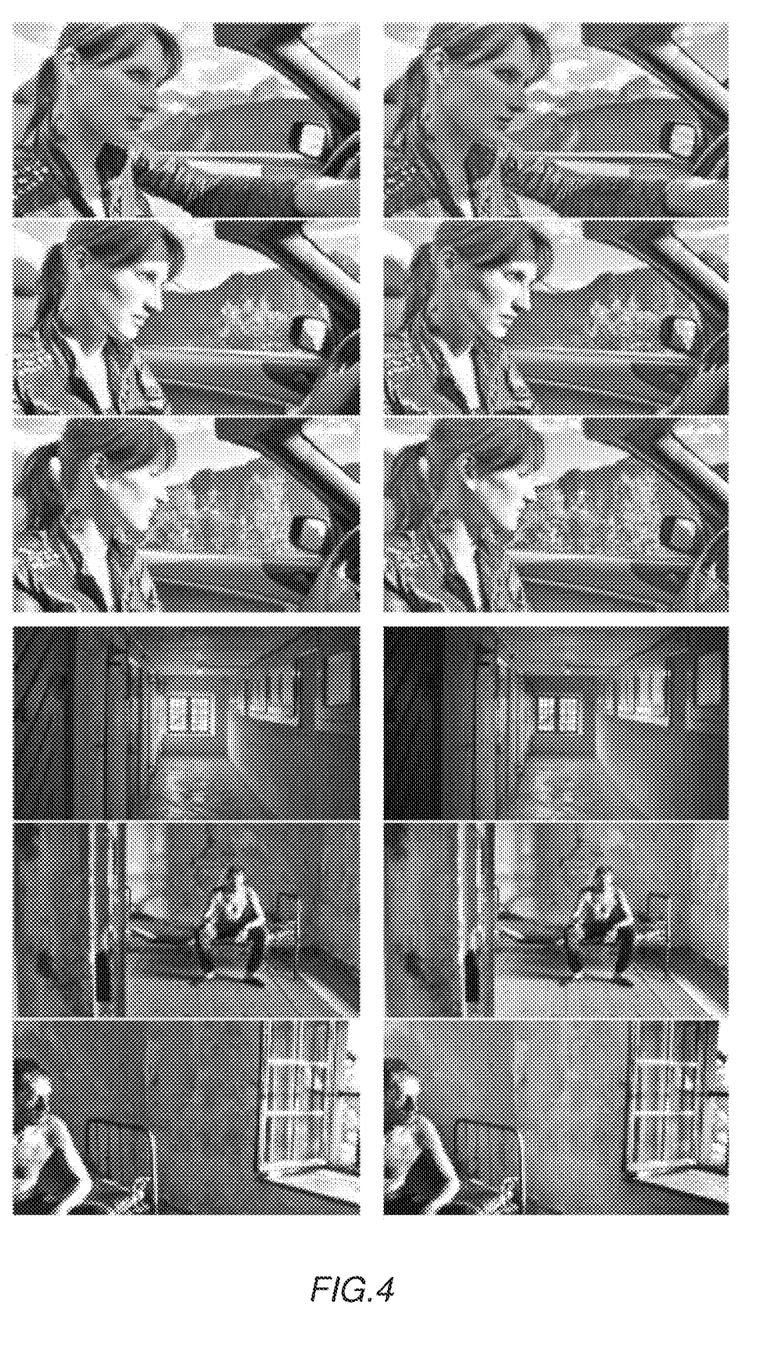
FIG. 4 illustrates a visual comparison of tone mapping techniques, according to one embodiment described herein.

FIG. 4 illustrates a visual comparison of tone mapping techniques, according to one embodiment described herein. Specifically, FIG. 4 illustrates a comparison between tone mapped images generated using the techniques described herein versus the techniques described in U.S. patent application Ser. No. 14/121,091. As shown, the difference between these images is inconsequential. Thus, the techniques described herein can be used to generate real-time feedback for editing video or real-time broadcasts without sacrificing a reduction in quality.

Figure 5:
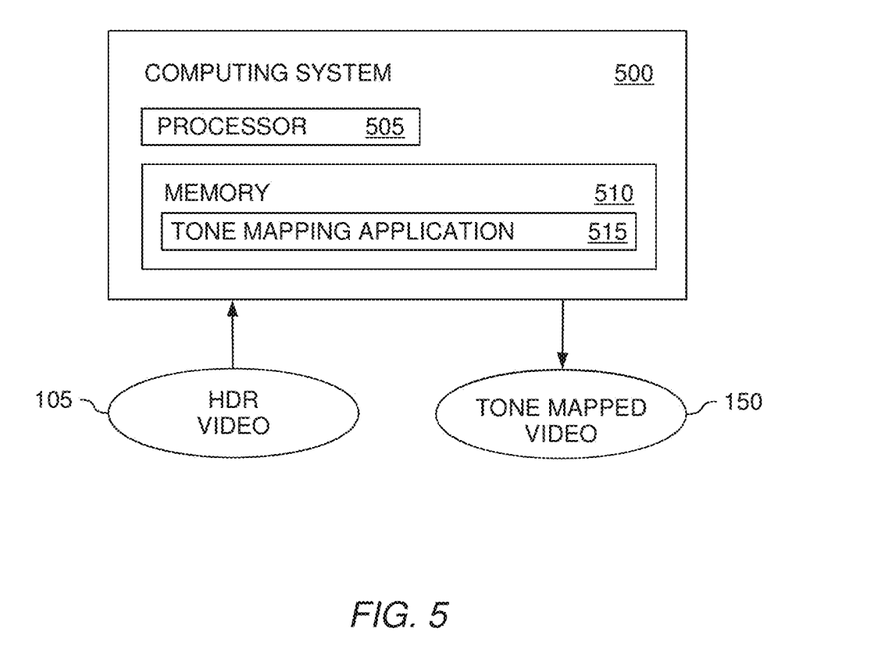
FIG. 5 illustrates a block diagram of a computing system for performing tone mapping, according to one embodiment described herein.

FIG. 5 illustrates a block diagram of a computing system 500 for performing tone mapping, according to one embodiment described herein. The computing system 500 (e.g., a tone mapping system) includes a processor 505 and memory 510. The computing system 500 may include a single computing device (e.g., a server) or multiple computing devices connected to a network. For example, the computing system 500 may be a data center or a cloud service.

The processor 505 represents one or more processing elements that each may include multiple cores. The memory 510 may include volatile or non-volatile memory elements such as main memory, hard disks, cloud storage, and the like. As shown, the memory 510 stores a tone mapping application 515 which performs the flows illustrated in FIGS. 1 and 3. The tone mapping application 515 may include any number of software programs for converting HDR video into tone mapped video. Moreover, in other embodiments, the computing system 500 includes hardware components for performing one or more of the steps shown in flows 100 and 300. For example, an application specific integrated circuit (ASIC) or a field-programmable gate array (FPGA) may be used to perform one or all of the steps in flow 100 and 300.

In the preceding, reference is made to embodiments of the invention. However, it should be understood that the invention is not limited to specific described embodiments. Instead, any combination of the preceding features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the aspects, features, embodiments and advantages described herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., tone mapping application 515) or related data available in the cloud. For example, the tone mapping application 515 could execute on a computing system in the cloud to convert the HDR video to tone mapped video. In such a case, the tone mapping application 515 could process the HDR video and store the resulting tone mapping video at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
generating, using a computer processor, a first base layer using a frame of a high dynamic range (HDR) video;
deriving a tone curve parameter from the first base layer, wherein the tone curve parameter is a statistical value derived from pixels in the first base layer;
temporally filtering the tone curve parameter using a previously measured value of the tone curve parameter derived from a second base layer, wherein the second base layer is derived from a previous frame of the HDR video; and
generating a temporally coherent base layer using a tone curve derived from the temporally filtered tone curve parameter.

2. The method of claim 1, further comprising:
generating a detail layer by dividing the frame of the HDR video by the first base layer.

3. The method of claim 2, further comprising:
generating a frame of a tone mapped video by combining the detail layer with the temporally coherent base layer.

4. The method of claim 1, wherein generating the first base layer comprises:
spatially filtering the frame of the HDR video in at least two dimensions to generate the first base layer.

5. The method of claim 4, wherein the frame of the HDR video is not temporally filtered when generating the first base layer.

6. The method of claim 1, wherein generating the temporally coherent base layer using the tone curve compresses a color range of the frame of the HDR video.

7. The method of claim 1, wherein temporally filtering the tone curve parameter comprises:
applying a first weight to the previously measured value of the tone curve parameter;
applying a second weight to a current value of the tone curve parameter of the frame of the HDR video; and
combining the weighted previously measured value and the weighted current value to generate an adjusted value of the tone curve parameter, wherein the tone curve is derived using the adjusted value.

8. The method of claim 1, wherein the tone curve maps luminance values in the first base layer to corresponding luminance values in the temporally coherent base layer.

9. A computer-readable storage medium comprising computer-readable program code embodied therewith, the computer-readable program code executable by a processor to:
generate a first base layer using a frame of a high dynamic range (HDR) video;
derive a tone curve parameter from the first base layer, wherein the tone curve parameter is a statistical value derived from pixels in the first base layer;
temporally filter the tone curve parameter using a previously measured value of the tone curve parameter derived from a second base layer, wherein the second base layer is derived from a previous frame of the HDR video; and
generate a temporally coherent base layer using a tone curve derived from the temporally filtered tone curve parameter.

10. The computer-readable storage medium of claim 9, further comprising computer-readable program code configured to:
generate a detail layer by dividing the frame of the HDR video by the first base layer; and
generate a frame of a tone mapped video by combining the detail layer with the temporally coherent base layer.

11. The computer-readable storage medium of claim 9, wherein generating the first base layer comprises computer-readable program code configured to:
spatially filter the frame of the HDR video in at least two dimensions to generate the first base layer.

12. The computer-readable storage medium of claim 8, wherein the frame of the HDR video is not temporally filtered when generating the first base layer.

13. The computer-readable storage medium of claim 9, wherein generating the temporally coherent base layer using the tone curve compresses a color range of the frame of the HDR video.

14. The computer-readable storage medium of claim 9, wherein temporally filtering the tone curve parameter comprises computer-readable program code configured to:
apply a first weight to the previously measured value of the tone curve parameter;
apply a second weight to a current value of the tone curve parameter of the frame of the HDR video; and
combine the weighted previously measured value and the weighted current value to generate an adjusted value of the tone curve parameter, wherein the tone curve is derived using the adjusted value.

15. A tone mapping system, comprising:
a computer processor; and
one or more memories containing a program which, when executed on the computer processor, performs an operation comprising:
generating a first base layer using a frame of a high dynamic range (HDR) video;
deriving a tone curve parameter from the first base layer, wherein the tone curve parameter is a statistical value derived from pixels in the first base layer;
temporally filtering the tone curve parameter using a previously measured value of the tone curve parameter derived from a second base layer, wherein the second base layer is derived from a previous frame of the HDR video; and
generating a temporally coherent base layer using a tone curve derived from the temporally filtered tone curve parameter.

16. The system of claim 15, wherein the operation further comprises:
generating a detail layer by dividing the frame of the HDR video by the first base layer; and
generating a frame of a tone mapped video by combining the detail layer with the temporally coherent base layer.

17. The system of claim 15, wherein generating the first base layer comprises:
spatially filtering the frame of the HDR video in at least two dimensions to generate the first base layer.

18. The system of claim 8, wherein the frame of the HDR video is not temporally filtered when generating the first base layer.

19. The system of claim 15, wherein generating the temporally coherent base layer using the tone curve compresses the color range of the frame of the HDR video.

20. The system of claim 15, wherein temporally filtering the tone curve parameter comprises:
applying a first weight to the previously measured value of the tone curve parameter;
applying a second weight to a current value of the tone curve parameter of the frame of the HDR video; and
combining the weighted previously measured value and the weighted current value to generate an adjusted value of the tone curve parameter, wherein the tone curve is derived using the adjusted value.

* * * * *